(12) United States Patent
Sidiroglou et al.

(10) Patent No.: US 8,407,785 B2
(45) Date of Patent: Mar. 26, 2013

(54) SYSTEMS, METHODS, AND MEDIA PROTECTING A DIGITAL DATA PROCESSING DEVICE FROM ATTACK

(75) Inventors: Stylianos Sidiroglou, New York, NY (US); Angelos D. Keromytis, New York, NY (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 248 days.

(21) Appl. No.: 12/063,733

(22) PCT Filed: Aug. 18, 2006

(86) PCT No.: PCT/US2006/032470
§ 371 (c)(1),
(2), (4) Date: Nov. 24, 2008

(87) PCT Pub. No.: WO2007/022454
PCT Pub. Date: Feb. 22, 2007

(65) Prior Publication Data
US 2009/0222922 A1   Sep. 3, 2009

Related U.S. Application Data

(60) Provisional application No. 60/709,170, filed on Aug. 18, 2005.

(51) Int. Cl.
*G06F 11/00* (2006.01)
(52) U.S. Cl. .............................. 726/22; 726/23; 726/24
(58) Field of Classification Search .......... 726/1, 11–15, 726/22–24; 713/176, 187–188
See application file for complete search history.

(56) References Cited

U.S. PATENT DOCUMENTS

| | | | |
|---|---|---|---|
| 5,968,113 A | 10/1999 | Haley et al. | |
| 6,079,031 A | 6/2000 | Haley et al. | |
| 6,154,876 A | 11/2000 | Haley et al. | |
| 6,701,440 B1 * | 3/2004 | Kim et al. | 726/24 |
| 6,715,084 B2 | 3/2004 | Aaron et al. | |
| 6,785,818 B1 | 8/2004 | Sobel | |
| 6,901,519 B1 | 5/2005 | Stewart | |
| 7,155,708 B2 | 12/2006 | Hammes et al. | |
| 7,334,262 B2 | 2/2008 | Szor | |
| 7,373,524 B2 | 5/2008 | Motsinger et al. | |
| 7,490,268 B2 | 2/2009 | Keromytis et al. | |
| 7,496,898 B1 | 2/2009 | Vu | |

(Continued)

FOREIGN PATENT DOCUMENTS

| | | |
|---|---|---|
| WO | WO 99/55052 | 10/1999 |
| WO | WO 99/63727 | 10/1999 |

OTHER PUBLICATIONS

US-CERT Incident Note IN-3-2003: Sobig Worm. http://www.cert.org/Incident_notes/IN-2003-03.html (2003).

(Continued)

*Primary Examiner* — Hosuk Song
(74) *Attorney, Agent, or Firm* — Byrne Poh LLP

(57) ABSTRACT

In accordance with some embodiments of the disclosed subject matter, systems, methods, and media for protecting a digital data processing device from attack are provided. For example, in some embodiments, a method for protecting a digital data processing device from attack is provided, that includes, within a virtual environment: receiving at least one attachment to an electronic mail; and executing the at least one attachment; and based on the execution of the at least one attachment, determining whether anomalous behavior occurs.

27 Claims, 7 Drawing Sheets

U.S. PATENT DOCUMENTS

| | | |
|---|---|---|
| 7,526,758 B2 | 4/2009 | Hasse et al. |
| 7,639,714 B2 | 12/2009 | Stolfo et al. |
| 7,818,781 B2 | 10/2010 | Golan et al. |
| 7,975,059 B2 | 7/2011 | Wang et al. |
| 8,074,115 B2 | 12/2011 | Stolfo et al. |
| 8,135,994 B2 | 3/2012 | Keromytis et al. |
| 8,214,900 B1 | 7/2012 | Satish et al. |
| 2001/0020255 A1 | 9/2001 | Hofmann et al. |
| 2002/0078382 A1 | 6/2002 | Sheikh |
| 2002/0083175 A1 | 6/2002 | Afek |
| 2002/0162026 A1 | 10/2002 | Neuman |
| 2003/0145225 A1 | 7/2003 | Bruton |
| 2004/0015726 A1 | 1/2004 | Szor |
| 2004/0044912 A1 | 3/2004 | Connary et al. |
| 2004/0098618 A1 | 5/2004 | Kim et al. |
| 2004/0128543 A1 | 7/2004 | Blake |
| 2004/0148520 A1 | 7/2004 | Talpade |
| 2004/0153823 A1 | 8/2004 | Ansari |
| 2005/0071655 A1 | 3/2005 | de Jong |
| 2005/0086333 A1 | 4/2005 | Chefalas et al. |
| 2005/0086630 A1 | 4/2005 | Chefalas et al. |
| 2005/0108562 A1 | 5/2005 | Khazan et al. |
| 2005/0166268 A1 | 7/2005 | Szor |
| 2006/0021029 A1 | 1/2006 | Brickell |
| 2006/0112342 A1 | 5/2006 | Bantz |
| 2006/0143688 A1 | 6/2006 | Futoransky |
| 2006/0143709 A1 | 6/2006 | Brooks et al. |
| 2006/0265694 A1 | 11/2006 | Chilimbi et al. |
| 2007/0283338 A1 | 12/2007 | Gupta et al. |
| 2009/0037682 A1 | 2/2009 | Armstrong et al. |
| 2009/0038008 A1 | 2/2009 | Pike |
| 2012/0167120 A1 | 6/2012 | Hentunen |

OTHER PUBLICATIONS

US-CERT Technical Cyber Security Alert TA04-028A: MyDoom Virus. http://www .us-cert.gov/cas/techalerts/TA04-028A.html(2004).

Spinellis, D., "Reliable identification of bounded-length viruses is NP-complete," IEEE Transactions on Information Theory 49 (2003) 280-284.

Apap, F. et al., "Detecting Malicious Software by Monitoring Anomalous Windows Registry Accesses," Proceedings of the 5th International Symposium on Recent Advances in Intrusion Detection (RAID) (2002).

International Search Report in International Application No. PCT/US2006/32470, mailed May 14, 2008.

International Preliminary Report on Patentability in International Application No. PCT/US2006/032470, issued Apr. 22, 2009.

Liston, T. and Skoudis, E., "On the Cutting Edge: Thwarting Virtual Machine Detection," 2006. http://handlers.sans.org/tliston/ThwartingVMDetection_Liston_Skoudis.pdf.

Zou, C.C. et al., "Feedback Email Worm Defense System for Enterprise Networks," Technical Report TR-04-CSE-05, Univ. of Massachusetts, ECE Department (2004).

Stolfo, S.J. et al., "Detecting Viral Propagations Using Email Behavior Profiles," ACM TOIT 2005 (2005).

Cohen, F., "Computer Viruses: Theory and Experiments," Computers & Security 6 (1987) 22-35.

Kephart, J.O., "A Biologically Inspired Immune System for Computers," Artificial Life IV: Proceedings of the Fourth International Workshop on the Synthesis and Simulation of Living Systems, MIT Press (1994) 130-139.

Miretskiy, Y. et al., "Avfs: An On-Access Anti-Virus File System," Proceedings of the 13th USENIX Security Symposium, (2004) 73-88.

Zou, C.C. et al., "Email Worm Modeling and Defense," Proceedings of the 3rd International Conference on Computer Communications and Networks (ICCCN) (2004).

Wong, C. et al., "A Study of Mass-Mailing Worms," Proceedings of the ACM Workshop on Rapid Malcode (WORM) (2004) 1-10.

Xiong. J., "ACT: Attachment Chain Tracing Scheme for Email Virus Detection and Control," Proceedings of the ACM Workshop on Rapid Malcode (WORM) (2004) 11-22.

Bhattacharyya, M. et al., "MET: An Experimental System for Malicious Email Tracking," Proceedings of the New Security Paradigms Workshop (NSPW) (2002) 1-12.

Schultz, M.G., et al., "Mef: Malicious email filter—a unix mail filter that detects malicious windows executables," Proceedings of the FREENIX Track: 2001 USENIX Annual Technical Conference (2001).

J. Yin, J.-P. Martin, A. Venkataramani, L. Alvisi, and M. Dahlin. Separating Agreement from Execution for Byzantine Fault Tolerant Services. In Proceedings of ACM SOSP, Oct. 2003.

Lee, W. (1999). A Data Mining Framework for Constructing Features and Models for Intrusion Detection Systems, PhD thesis, Columbia University.

A. Avizienis. The N-Version Approach to Fault Tolerent Software. IEEE Transactions on Software Engineering, 11(12): 149n1501, 1985.

A. Rudys and D. S. Wallach. Termination in Language-based Systems. ACM Transactions on In/onnation and System Security, 5(2), May 2002.

A. Rudys and D. S. Wallach. Transactional Rollback for Language-Based Systems. In ISOC Symposium on Network and Distributed Systems Security (SNDSS), Feb. 2001.

Andrew Honig, Andrew Howard, Eleazar Eskin, and Salvatore Stolfo. Adaptive Model Generation: An Architecture for the Deployment of Data Mining-based Intrusion Detection Systems. In Data Mining for Security Applications. Kluwer, 2002.

Armstrong, D. et al. "Controller-Based Autonomic Defense System." Proc. Of DISCEX. (2003).

B. Chess. Improving Computer Security Using Extended Static Checking. In Proceedings of the IEEE Symposium on Security and Privacy, May 2002.

B. Demsky and M. C. Rinard. Automatic Detection and Repair of Errors in Data Structures. In Proceedings of the 18th Annual ACM SIGPLAN Conference on Object Oriented Programming, Systems, Languages, and Applications, Oct. 2003.

B. Scholkopf, J. Platt, J. Shawe-Taylor, A. J. Smola, and R. C. Williamson, "Estimating the Support of a High-Dimensional Distribution," Technical Report 99-87, Microsoft Research, 1999, to appear in Neural Computation, 2001.

Bulba and KIL3R, "Bypassing StackGuard and Stack-Shiled," Phrack, 5(56), May 2000.

C. C. Zou, W. Gong, and D. Towsley, Code Red Worm Propagation Modeling and Analysis, In Proceedings of the 9th ACM Conference on Computer and Communications Security (CCS), pp. 138-147, Nov. 2002.

C. Nachenberg, Computer Virus—Coevolution, Communications of the ACM, 50(1):46-51,1997.

CERT Advisory CA-2003-04: MS-SQL Server Worm. http://www.cert.org/advisories/CA-2003-04.html, Jan. 2003.

CERT Advisory CA-2003-19: Exploitation of Vulnerabilities in Microsoft RPC Interface. http://www.cert.org/advisories/CA-2003-19.html, Jul. 2003.

CERT Advisory CA-2003-20 W32/Blaster worm. http://www.cert.org/advisories/CA-2003-20.html, Aug. 2003.

Chew, M. et al., "Mitigating Buffer Overflows by Operation System Randomization," Technical Report Computer Science Technical Report 65, Carnegie Mellon University, Dec. 2002.

Conover, M., w00w00 n Heap Overflows, http://www.w00w00.org/files/articles/heaptut.txt, Jan. 1999.

Cowan, C. et al. "Stackguard: Automatic adaptive detection and prevention of buffer-overflow attacks," Proceedings of the 7th USENIX Security Symposium, Jan. 1998.

Cowan, C. et al. "SubDomain: Parsimonious Security for Server Appliances," Proceedings of the 14th USENIX System ADministration Conference (LISA 2000) Mar. 2000.

Cowan, C. et al., "FormatGuard: Automatic Proctection From Print Format String Vulnerabilites," Proceedings of the 10th USENIX Security Symposium, 191-199, Aug. 2001.

D. Bruening, T. Garnett, and S. Amarasinghe. An Infrastructure for Adaptive Dynamic Optimization. In Proceedings of the International Symposium on Code Generation and Optimization, pp. 265-275, 2003.

D. E. Denning. An Intrusion Detection Model. IEEE Transactions on Software Engineering, SE-13:222-232, 1987.

D. E. Geer. Monopoly Considered Harmful. IEEE Security & Privacy, 1(6):8-10, Nov./Dec. 2003.

D. Moore, C. Shanning, and K. Claffy. Code-Red: A Case Study On the Spread and Victims of an Internet Worm. In Proceedings of the 2nd Internet Measurement Workshop (IMW). pp. 273-284, Nov. 2002.

D. Mosberger et al., "httperf—A Tool for Measuring Web Server Performatnce," HP Research Labs, 1998.

D. Nojiri. J. Rowe, and K. Levitt. Cooperative Response Strategies for Large Scale Attack Mitigation. In Proceedings of the 3rd DARPA Information Survivability Conference and Exposition (DISCEX), pp. 293-302, Apr. 2003.

D. Song. R. Malan, and R. Stone. A Snapshot of Global Internet Worm Activity. Technical Report, Arbor Networks, Nov. 2001.

Eskin, Anomaly Detection Over Noisy Data Using Learned Probability Distributions, Proceedings of the Seventeenth International Conference on Machine Learning (ICML-2000), 2000.

E. Larson and T. Austin, High Coverage Detection of Input-Related Security Faults, In Proceedings of the 12th USENIX Security Symposium, pp. 121-136, Aug. 2003.

F. Apap, A. Honig, S. Hershkop, E. Eskin, and S. Stolfo. Detecting Malicious Software by Monitoring Anomalous Windows Registry Accesses. Proceedings of the Fifth International Symposium on Recent Advances in Intrusion Detection (RAID 2002), 2002.

Friedman Net al., (1999) "Efficient Bayesian Parameter Estimation in Large Discrete Domains."

G. W. Dunlap, S. King, S. Cinar, M. A. Basrai, and P. M. Chen. Re Virt: Enabling Intrusion Analysis Through Virtual-Machine Logging and Replay. In Proceedings of the 2002 Symposium on Operating Systems Design and Implementation (OSDI). Feb. 2002.

Ghosh, A. K. et al. "A Study in Using Neural Networks for Anomaly and Misuse Detection." In Proceedings of the 8th USENIX Security Symposium, (1999).

H. Shacham, M. Pagem B. Pfaff, E. Goh, N. Modadugu, and D. Boneh. On the Effectiveness of Address-Space Randomization. In Proceedings of the 11th ACM Conference on Computuer and Communications Security (CCS), pp. 298-307, Oct. 2004.

H. Toyoizumi and A. Kara. Predators: Good Will Mobile Codes Combat against Computer Viruses, In Proceedings of the New Security Paradigms Workshop (NSPW), pp. 13-21, Sep. 2002.

Honig A et al., (2002) "Adaptive model generation: An Architecture for the deployment of data mining-based intrusion detection systems." In Data Miningfor Security Applications. Kluwer.

Chan et al., A Machine Learning Approach to Anomaly Detection, Technical Report, Department of Computer Science, Florida Institute of Technology, Mar. 2003, pp. 1-13.

Jones, R. W. M. et al., "Backwards-compatible bounds checking for arrays and pointers in C program," Third International Workshop on Automated Debugging, 1997.

Internet Engineering Task Force. Intrusion Detection Exchange Format. http://www.ietj.orglhtml.chanerslidwg-chaner.html, 2000.

Ioannidis, J. et al., "Implementing Push-Back: Router-Based Defense Against DDoS Attacks," Proceedings of the ISOC Symposium on Network and Distributed System Security (SNDSS), Feb. 2002.

J. A. Whittaker. No Clear Answers on Monoculture Issues. IEEE Security & Privacy, 1(6):18-19, Nov./Dec. 2003.

J. C. Reynolds, J. Just, E. Lawson, L. Clough, and R. Maglich. "The Design and Implementation of an Intrusion Tolerant System." In Proceedings of the International Conference on Dependable Systems and Networks (DSN), Jun. 2002.

J. Etoh. GCC Extension for Protecting Applications From Stack-smashing Attacks. In http://www.trl.ibm.com/projects/security/ssp, Jun. 2000.

J. F. Shoch and J. A. Hupp, The "worm" programs—early experiments with a distributed computation, Communications of the ACM, 22(3):172-180, Mar. 1982.

J. Oplinger and M. S. Lam. Enhancing Software Reliability with Speculative Threads. In Proceedings of the 10th International Conference on Architectural Support for Programming Languages and Operating Systems (ASPLOS X), Oct. 2002.

J. Sugerman, G. Venkitachalam, and B.H. Lim. "Virtualizing I/O Devices on VMware Workstation's Hosted Virtual Machine Monitor." Proceedings of the 2001 USENIX Annual Technical Conference. Jun. 2001.

J. Twycross and M. M. Williamson. Implementing and Testing a Virus Throttle. In Proceedings of the 12th USENIX Security Symposium, pp. 285-294, Aug. 2003.

Larochelle, D. et al., "Statically Detecting Likely Buffer Overflow Vulnerabilites," Proceedings of the 10th USENIX Security Symposium, 177-190, Aug. 2001.

Lee, W. and S. Stolfo. "A Framework for Constructing Features and Models for Instrusion Detection Systems." ACM Transactions on Information and System Security, 3(4): 227-261. (Nov. 2000).

M. Damashek. "Gauging Similarity with N-Grams: Language Independent Categorization of Text." Science 1995.

M. Mahoney and P. Chan. Detecting Novel Attacks by Identifying Anomalous Network Packetheaders. Technical Report CS-2001-2, Florida Institute of Technology, Melbourne, FL, 2001.

M. Rosenblum, E. Bugnion, S. Devine, and S. A. Herrod, Using the SimaS Machine Simulator to Study Complex Computer Systems, Modeling and Computer Simulation, 7(1 ):78-1 03, 1997.

M. Stamp. Risk of Monoculture, Communications of the ACM, 47(3):120, Mar. 2004.

Williamson, Throttling Viruses: Restricting Propagation to Defeat Malicious Mobile Code, Technical Report HPL-2002-172, HP Laboratories Bristol, 2002.

M.-J. Lin, A. Ricciardi, and K. Marzullo, A New Model for Availability in the Face of Self-Propagating Attacks, In Proceedings of the New Security Paradigms Workshop, Nov. 1998.

Friedman and Y. Singer. Efficient Bayesian Parameter Estimation in Large Discrete Domains, 1999.

N. Nethercote and J. Seward, Valgrind: A Framework for Heavyweight Dynamic Binary Instrumentation, PLDI'07, Jun. 7, 2007.

N. Wang, M. Fertig, and S. Patel, Y-Branches: When You Come to a Fork in the Road, Take It, In Proceedings of the 12th International Conference on Parallel Architectures and Compilation Techniques, Sep. 2003.

Prasad, M. et al., "A Binary Rewritting Defense Against Stack-based Buffer Overflow Attacks," Proceedings of the USENIX Annual Technical Conference, 211-224, Jun. 2003.

R. Janakiraman, M. Waldvogel, and Q. Zhang, Indra: A peer-topeer approach to network intrusion detection and prevention, In Proceedings of the IEEE International Workshops on Enabling Technologies: Infrastructure for Collaborative Enterprises (WETICE), Workshop on Enterprise Security, Jun. 2003.

R. Sekar, V. Venkatakrishnan, S. Basu, S. Bhatkar, and D. C. DuVaney, Model-Carrying Code: A Practice Approach for Safe Execution of Untrusted Applications, In Proceedings of ACM SOSP, Oct. 2003.

S. A. Crosby and D. S. Wallach. Denail of Service via Algorithmic Complexity Attacks. In Proceedings of the 12th USENIX Security Symposium, pp. 29-44, Aug. 2003.

S. A. Hofmeyr, Stephanie Forrest, and A. Somayaji. Intrusion detect using sequences of system calls. Journal of Computer Security, 6:151-180,1998.

S. Brilliant, J. C. Knight, and N. G. Leveson. Analysis of Faults in an N-Version Software Experiment. IEEE Transactions on Software Engineering, 16(2), Feb. 1990.

S. M. Bellovin, Distributed Firewalls, ;Login: Magazine, Special Issue on Security, Nov. 1999.

S. P. Amarsinghe. On the Run—Building Dynamic Program Modifiers for Optimization, Introspection, and Security. Laboratory for Computer Science, Massachusetts Institute of Technology, 2002.

S. T. King, G. Dunlap, and P. Chen. Operating System Support for Virtual Machines. In Proceedings of the General Track: USENIX Annual Technical Conference, Jun. 2003.

Spafford, E. H., "The Internet Worm Program: An Analysis," Technical Report CSD-TR-823, Purdue University, West Lafayette, Indiana, IN 47907-2004, 1988.

Steve R. White. Open Problems in Computer Virus Research. In Virus Bulletin Conference, 1998.

T. C. Miller and T. de Raadt, strlcpy and strlcal: Consistent, Safe, String Copy and Concatenation, In Proceedings of the USENIX Annual Technical Conference, Freenix Track, Jun. 1999.

T. Toth and C. Kruegel. Connection-history Based Anomaly Detection. In Proceedings of the 1EEE Workshop on Information Assurance and Security, Jun. 2002.

The Spread of the Sapphire/Slammer Worm. http://www.silicondefense.com/research/worms/slammer.php, Feb. 2003.

V. Prevelakis. A Secure Station for Network Monitoring and Control. In Proceedings of the 8th USENIX Security Symposium, Aug. 1999.

W. Lee and S. J. Stolfo, "Data Mining Approaches For Intrusion Detection," Proceedings of the USENIX Security Symposium, 1998.

W. Lee, S. J. Stolfo, and K. Mok. Data mining in work flow environments: Experiences in intrusion detection. In Proceedings of the 1999 Conference on Knowledge Discovery and Data Mining (KDD-99), 1999.

W. Lee, S. J. Stolfo, and P. K. Chan. Learning patterns from unix processes execution traces for intrusion detection. pp. 50-56. AAAI Press, 1997.

Wilander, J. et al., "A Comparison of Publicly Available Tools for Dynamic Intrusion Prevention," Proceedings of the 10th Network and Distributed System Security Symposium (NDSS), 123-130, Feb. 2003.

A. J. Malton. "The Denotational Semantics of a Functional Tree-Manipulation Language," Computer Languages, 19(3); 157-168, 1993.

A. Smirnov and T. Chiueh. DIRA Automatic Detection, Identification, and Repair of Control-Hijacking Attacks. In Proceedings of the 12th Symposium on Network and Distributed System Security (NDSS), Feb. 2005.

ALEPH ONE, "Smashing the Stack for Fun Profit," Phrack, 7(49), 1996.

B. Demsky and M. C. Rinard, "Automatic Data Structure Repair for Self-Healing Systems" In Proceedings of the 1st Workshop on Algorithms and Architectures for Self-Managing Systems, Jun. 2003.

Baratloo, A. et. al., "Transparent Run-Time Defense Against Stack Smashing Attacks," Proceedings of the 2000 USENIX Annual Technology Conference, Jun 2000.

Barrantes, G. et al., "Randomized Instruction Set Emulation to Disrupt Binary Code Injection Attacks," Proceedings of the 10th ACM Conference on Computer and Communications Security (CCS) Conference, Oct. 2003.

Bhatkar, S. et al., "Address Obfuscation: An Efficient Approach to Combat a Broad Range of Memory Error Exploits," Proceedings of the 12th USENIX Security Symposium, 105-120, Aug. 2002.

Biles, S. Dectecting the Unknown with Snort and the Statistical Packet Anomaly Detection Engine (SPADE) Computer Security Online Ltd., Tech Republic 2003.

C. C. Zou, L. Gao, W. Gong, and D. Towsley, "Monitoring and Early Warning for Internet Worms" In Proceedings of the 10th ACM International Conference on Computer and Communications Security (CCS), pp. 190-199, Oct. 2003.

CERT Advisory CA-2001-19, "Code Red Worm Exploiting Buffer Overflow in IIS Indexing Service DLL," http://www.cert.org/advisories/CA-2001-19.html, Jul. 2001.

CERT Advisory CA-2003-21: W32/Blaster Worm. http:www.silicondefense.com/research/worms/slammer.php, Feb. 2003.

Chen, H. et al., "MOPS: an Infrastructure for Examining Security Properties of Software," Proceedings of the ACM Computer and Communications Security (CCS) Conference, 235-244, Nov. 2002.

Christodorescu, M. and S. Jha. Static Analysis of Executables to Detect Malicious Patterns. In Proceedings of the 12th USENIX Security Symposium, pp. 169-186, Aug. 2003. Washington, D.C.

Cowan. C. et al., "PointGuard: Protecting Pointers From Buffer Overflow Vunerabilities," Proceedings of the 12th USENIX Security Symposium, 91-104, Aug. 2003.

D. Moore, C. Shannon, G. Voelker and S. Savage, "Internet Quarantine: Requirements for Containing Self-Propagating Code," In Proceedings of the 12th ISOC Symposium on Network and Distributed System Security (SNDSS), pp. 221-237, Feb. 2005.

D. E. Denning, An intrusion Detection Model, Technical Report, Computer Science Laboratory, SRI International, 1993).

Dierks, T. and Allen, C., (Jan. 1999) "The TLS Protocol Version 1.0" RFC 2246. [Online]. Available: http://www.ietf.org/rfc/3348.txt.

Engler D. et al., "RacerX: Effective, Static Detection of Race Conditions and Deadlocks," Proceedings of ACM SOSP, Oct. 2003.

Forrest S. Hofmeyer S A, Somayaji A, Longstaff T A, A Sense of Self for Unix Processes. IEEE Symposium on Research in Security and Privacy: 120-128, 1996.

Frantzen, M. et al., "StackGhost: Hardware facilitated stack protection," Proceedings of the USENIX Security Symposium, 55-56, Aug. 2001.

G. Candea and A. Fox "Crash-Only Software," In Proceedings of the 9th Workshop on Hot Topics in Operating Systems (HOTOS-IX), May 2003.

G. E. Suh, J. W. Lee, D. Zhang, and S. Devades, Secure Program Execution via Dynamic Information Flow Tracking. In Proceedings of the 11th International Conference on Architectural Support for Programming Languages and Operating Systems (ASPLOS-XI), Oct. 2004.

Garfinkel, T. "Traps and Pitfalls; Practical Problems in System Call Interposition Based Security Tools," Proc. Network and Distributed Systems. Security Symposium, Feb. 2003.

Goldberg, I., et al., "A Secure Environment for Untrusted Helper Applications," Proceeding of the 1990 USENIX Annual Technical Conference, 1996.

H. Dreger, C. Kreibich, V. Paxson, and R. Sommer, "Enhancing the Accuracy of Network-Based Intrusion Detection with Host-Based Context" In Proceedings of GI SIG SIDAR Conference on Detection of Intrusions and Malware and Vuneralbility Assessment (DIMVA), 2005.

Hangal et al., Tracking down software bugs using automatic anomaly detection, Proceedings of the 24th International conference on software engineering, May 2002, pp. 291-301.

International Patent Application No. PCT/US06/15080, filed Apr. 21, 2006.

International Patent Application No. PCT/US06/41591, filed Oct. 25, 2006.

International Preliminary Report on Patentability in International Patent Application No. PCT/US06/15080, filed Apr. 21, 2006, mailed Mar. 19, 2009.

International Preliminary Report on Patentability in International Patent Application No. PCT/US06/41591, filed Oct. 25, 2006, mailed Apr. 2, 2009.

J. C. Reynolds, J. Just E. Lawson, L. Clough, and R. Maglich "Online Intrusion Protection by Dectection Attacks with Diversity," In Proceedings of the 16th Annual IFIP 11.3 Working Conference on Data and Application Security Conference, Apr. 2002.

J. E. Just, L. A. Clough, M. Danforth, K. N. Levitt, R. Maglich, J. C. Reynolds, and J. Rowe, "Learning Unknown Attacts—A Start." In Proceedings of the 5th International Symposium on Recent Advances in Intrusion Detection (RAID), Oct. 2002.

Jim, T. et al., "Cyclone; A safe dialect of C." Proceedings of the USENIX Annual Technical Conference, 275-288, Jun. 2002.

K. Ashcraft and D. Engler. Detecting Lots of Security Holes Using System-Specific Analysis In Proceedings of the IEEE Symposium in Security and Privacy, May 2002.

Kc, G.S. et al., "Countering Code-Injection Attacks With Instruction-Set Randomization," Proceedings of the ACM Computer and Communications Security (CCS) Conference, 272-280, Oct. 2003.

Kent, S. et al., "Security Architecture for the Internet Protocol," RFC 2401, Nov. 1998.

King, S. T. and Chen, P. M. "Backtracking Intrusions," University of Michigan, Department of Electrical Engineering and Computer Science.

Kiriansky, V. et al., "Secure execution via program shepherding," Proceeding of the 11th USENIX Security Symposium, 191-205, Aug. 2002.

Kodialam, M. and Lakshman, T. V., "Detecting Network Intrusions via Sampling: A Game Theoretic Approach," 2003, Bell Laboratories, Lucent Technologies.

Krugel, C. et al., "Service Specific Anomaly Detection for Network Intrusion Detection," In Proceedings of the ACM Symposium on Applied Computing (SAC), Spain, (Mar. 2002).

Lhee, K. et al., "Type-Assisted Dynamic Buffer Overflow Detection," Proceedings of the USENIX Security Symposium, 81-90, Aug. 2002.

Lippmann, R. et al., "The 1999 DARPA Off-Line Intrusion Detection Evaluation." Computer Networks, 34(4): 579-595, (2000).

Locasto M. E., Wang, K., Keromytis, A.D., and Stolfo, S.J. FLIPS: Hybrid Adaptive Intrusion Prevention. In Proceedings of the 8th International Symposium on Recent Advances in Intrusion Detection (RAID). pp. 82-101.

M. Rinard, C. Cedar, D. Dumitran, D. Roy, T. Leu, and J.W. Beebee. "Enhancing Server Availability and Security Through Failure-Oblivious Computing," In Proceeding 6th Symposium on Operating systems Design and Implementation (OSDI), Dec. 2004.

M. Roesch, "Snort; Lightweight intrusion Detection for Networks," In Proceeding of USENIX USA, Nov. 1999. (Software available from http://www.snort.org/).

Mahoney, M. "Network Traffic Anomaly Detection Based on packet Bytes," Proc. ACM-SAC. (Feb. 3, 2003).

Mahoney, M. and P. K. Chan. "Analysis of the 1999 DARPA/Lincoln Laboratory Evaluation Data for Network Anomaly Detection." RAID, pp. 220-237, (2003).

Mahoney, M. And P.K. Chan. "Learning Models of Network Traffic or Detecting Novel Attacks," Florida Tech. Technical report, http://cs:fit.edu/tr/ (2002).

Mahoney, M. And P. K. Chan. "Learning Nonstationary Models of Normal Network Traffic for Detecting Novel Attacks," Proc. SIGKDD, pp. 376-385 (2002).

Newsome, J. and Song, D., Dynamic Taint Analysis for Automatic Detection, Analysis, and Signature Generation of Exploits on Commodity Software, In Proceedings of the 12th Annual Network and Distributed System Security Symposium, Feb. 2005.

Office Action dated Aug. 23, 2010 in U.S. Appl. No. 12/091,150.

Office Action dated Nov. 7, 2011 in U.S. Appl. No. 12/297,730.

Paxson, V. "Bro: A system for detecting network intruders in real-time," USENIX Security Symposium. San Antonio, Texas, (1998).

Peterson, D. S. et al., "A Flexible Containment Mechanism for Executing Untrusted Code," Proceedings of the 11th USENIX Security Symposium, 207-225, Aug. 2002.

Porras, P. and P. Neumann, "EMERALD, Event Monitoring Enabled Responses to Anomalous Live Disturbances," National Information Systems Security Conference. (1997).

Prevelakis, V. et al., "Sandboxing Applications," Proceedings of the USENIX Technical Annual Conference, 119-126, Jun 2001.

Provos, N., "Improving Host Security with System Call Policies," Proceedings of the 12th USENIX Security Symposium, Washington, pp. 257-272, Aug. 2003.

Proves, N. et al., "Preventing Privilege Escalation," 12th USENIX Security Symposium, Washington, DC, Aug. 2003.

Rinard, M., Cadar C., Dumitran, D., and Leu, T., A Dynamic Technique for Eliminating Buffer Overflow Vunerabilities (and Other Memory Errors), In Proceedings 20th Annual Computer Security Applications Conference(ACSAC) 2004, Dec. 2004.

S. A. Holmeyr, A. Somayaji, and S. Forrest, Intrusion Detection System Using Sequences of System Calls. Journal of computer Security, 6(3):151-180, 1998.

S. Forrest, A. Somayaji, and D. Ackley. "Building Diverse Computer Systems," In Proceedings of the 6th Workshop on Hot Topics in Operating Systems, pp. 67-72, 1997.

S. Sidiroglou and A. D. Keromytis, A Network Worm Vaccine Architecture In Proceedings of the IEEE Workshop on Enterprise Technologies: Infrastructure for Collaborative Enterprises (WETICE). Workshop on enterprise Security, pp. 220-225, Jun. 2003.

S. Sidiroglou, M. E. Locasio, S. W. Boyd, and A. D. Keromytis. "Building a Reactive Immune System for Software Services." In Proceedings of the USENIX Annual Technical Conference, pp. 149-161, Apr. 2005.

Staniford. V. Paxcon, and N. Weaver. "How to Own the Internet in Your Spare Time." In Proceedings of the 11th USENIX Security Symposium, pp. 149-167, Aug. 2002.

Sekar, R. et. al., "Specification based Anomaly Detection. A New Approach for Detection Network Intrusions" Proc. ACM CCS. (2002).

T. Toth and C. Kruegel, "Accurate Buffer Overflow Detection via Abstract Payload Execution," In Proceedings of the 5th Symposium on Recent Advances In Intrusion Detection (RAID), Oct. 2002.

Taylor, C. and J. Alves-Foss, "NATE-Network Analysis of Anomalous Traffic Events, A Low-Cost Approach" New Security Paradigms Workshop (2001).

U.S. Appl. No. 12/091,150, filed Apr. 22, 2008.

U.S. Appl. No. 12/297,730, filed Oct. 20, 2008.

U.S. Appl. No. 60/709,170, filed Aug. 18, 2005.

U.S. Appl. No. 60/730,289, filed Oct. 25, 2005.

Using Network-Based Application Recognition and Access Control Lists for Blocking the "Code Red" Worm at network Ingress Points. Technical Report, Cisco Systems, Inc., Date Unknown.

Vigna, G. and Kemmerer, R., "NetSTAT: A Network-Based Intrusion Detection System." Journal of Computer Security, 7:37-71, (1999).

Warrender, C. et al., "Detecting Intrusions Using System Call: Alternative Data Models," IEEE Symposium on Security and Privacy, 133-145, 1999.

Whitaker, A. et al., "Scale and Performance in the Denali Isolation Kennel," Proceedings of the Fifth Symposium on Operating Systems Design and Inplementation (OSDI 2002), Boston, MA, Dec. 2002.

Younan et al., A Methodology for Designing Countermeasures Against Current and Future Code Injection Attacks, IEEE. Mar. 23-24, 2005 pp. 3-20.

Happy99 URL. http://www.symantec.com/security_response/index.jsp, Symantec, Jan. 27, 1999.

The Code Security Analysis Kit (CoSAK) http://serg.cs.drecel.edu/cosak/index.shtml/, Final Technical Report, Jan. 2004.

Wang C et al., "On computer viral infection and the effect of immunization" Proceedings of the 16th ACM Annual Computer Applications Conference, 2000.

Web Surver, http://www.securityspace.com/s_survey/data/200304/, May 1, 2003.

Office Action dated Jun. 15, 2012 in U.S. Appl. No. 12/297,730.

"Trojan/XTCP", Panda Software's Center for Virus Control, Jun. 22, 2002, available at: http://www.ntsecurity.net/Panda/Index.cfm?FuseAction=Virus&VirusID=659.

Baecher, P. and Koetter. M., "libemu", Jul. 22, 2011, available at: http://libemu.carnivore.it/.

Baumgartner, K. "The ROP Pack" Abstract, In Proceedings of the 20th Virus Bulletin International Conference, Vancouver, BC, CA, Sep. 29-Oct. 1, 2010.

Baumgartner, K. "The ROP Pack", Presentation, In Proceedings of the 20th Virus Bulletin international Conference, Vancouver, BC, CA. Sep. 29-Oct. 1, 2010.

Checkoway, L. et al., "Return-Oriented Programming Without Returns", Proceedings of the 17th ACM Conference on Computer and Communications Security (CCS 2010) Chicago, IL, USA, Oct. 4-8, 2010, pp. 559-572.

Cova, M., et al., "Detection and Analysis of Drive-by-Download Attacks and Malicious JavaScript Code", In Proceedings of the 19th International Conference on World Wide Web (WWW '10), Raleigh, NC, USA, Apr. 26-30, 2010, pp. 281-290.

Egele, M. et al., "Defending Browsers against Drive-By Downloads: Mitigating Heap-Spraying Code Injection Attacks", In Proceedings of the 6th International Conference on Detection of Intrusions and Malware, and Vulnerability Assessment (DIMVA '09), Como, IT, Jul. 9-10, 2009, pp. 88-106.

Erlingsson, U., "Low-Level Software Security Attack and Defenses", Technical Report MSR-TR-07-153, Microsoft Corporation, Nov. 2007, available at http://research.microsoft.com/pubs/64363/tr-2007-153.pdf.

Garfinkel, T. and Rosenblum, M., "A Virtual Machine Introspection Based Architecture for Intrusion Detection" In Proceedings of the 10th Network and Distributed System Security Symposium (NDSS '03), San Diego, CA, USA, Feb. 6-7, 2003, pp. 191-206.

Goth, G., "Addressing the Monoculture", In IEEE Security & Privacy, vol. 99, No. 6, Nov./Dec. 2003, pp. 8-10.

Hensing, R. "Understanding DEP as a Mitigation Technology", Microsoft Corporation, Jun. 12, 2009, available at http://blogs.technet.com/b/srd/archive/2009/06/12/understanding-dep-as-a-mitigation-technology-part-1.aspx.

International Patent Application No. PCT/US2012/055824, filed Sep. 17, 2012.

International Search Report in International Patent Application No. PCT/US2006/015080, filed Apr. 21, 2006, mailed Jul. 7, 2008.

International Search Report in International Patent Application No. PCT/US2006/041591, filed Oct. 25, 2006, mailed Jun. 25, 2008.

International Search Report in International Patent Application No. PCT/US2012/055824, filed Sep. 17, 2012, mailed Dec. 7, 2012.

Ioannidis, S. et al., "Implementing a Distributed Firewall", In Proceedings of the ACM Conference on Computer and Communications Security (CCS'00), Athens, GR, Nov. 1-4, 2000, pp. 190-199.

Javitz, H. S. and Valdes, A., "The NIDES Statistical Component: Description and Justification" Techical Report 3131, SRI International, Computer Science Laboratory, Mar. 7, 1994, pp. 1-47.

Kruegel, C., et al., "Polymorphic Worm Detection Using Structural Information of Executables", Proceedings of the 8th International Symposium on Recent Advances in Intrusion Detection (RAID'05), Seattle, WA, USA, Sep. 7-9, 2005, pp. 207-226.

Lee, W., et al., "A Data Mining Framework for Building Intrusion Detection Models", In Proceedings of the 1999 IEEE Symposium on Security and Privacy, Oakland, CA, USA, May 9-12, 1999, pp. 120-132.

Liston, T., "Welcome To My Tarpit, The Tactical and Strategic Use of LaBrea", Feb. 17, 2003, available at: http://download.polytechnic.edu.na/pub4/download.sourceforge.net/pub/sourceforge/l/la/labrea/Oldfiles/LaBrea-Tom-Liston-Whitepaper-Welcome-to-my-tarpit.txt.

Polychronakis, M., et al., "Comprehensive Shellcode Detection Using Runtime Heuristics" In Proceedings of the 26th Annual Computer Security Applications Conference (ACSAC '10), Austin, TX, USA, Dec. 6-10, 2010, pp. 287-296.

Polychronakis, M., et al., "Emulation-Based Detection of Non-Self-Contained Polymorphic Shellcode", In Proceedings of the 10th International Conference on Recent Advances in Intrusion Detection (RAID'07), Gold Coast, AU, Sep. 5-7, 2007, pp. 87-106.

Polychronakis, M., et al., "Network-Level Polymorphic Shellcode Detection Using Emulation", In Proceedings of the Third Conference on Detection of Intrusions and Malware & Vunerability Assessment (DIMVA '06), Berlin, DE, Jul. 13-14, 2006, pp. 54-73.

Ratanaworabhan. P., et al., "NOZZLE: A Defense Against Heap-Spraying Code Injection Attacks" In Proceedings of the 18th USENIX Security Symposium, Montreal, CA, Aug. 10-14, 2009, pp. 169-186.

Seward, J. and Nethercote, N., "Valgrind, An Open-Source Memory Debugger for x86-GNU/Linux" , May 5, 2003, available at: http://developer.kds.org/~sewardj/.

Shacham, H., "The Geometry of Innocent Flesh on the Bone: Return-into-Libc Without Function Calls (On the x86)", Proceedings of the 14th ACM Conference on Computer and Communications Security (CCS'07), Alexandria, VA, USA, Oct. 29-Nov. 2, 2007, pp. 552-561.

Snow, K. Z., et al., "ShellOS: Enabling Fast Detection and Forensic Analysis of Code Injection Attacks", In Proceedings of the 20th USENIX Security Symposium (SEC'11), San Francisco, CA, USA, Aug. 8-12, 2011, pp.

Solar Designer, "Getting Around Non-Executable Stack (and Fix)", Seclist.org. Aug. 10, 1997, available at http://seclists.org/bugtrac/1997/Aug/63.

Sole, P., "Hanging on a ROPe", Presentation, immunity.com, Sep. 20, 2010, available at: http://www.immunitysec.com/downloads/DEPLIB20_akoparty.pdf.

Toth, T. and Kruegel, C., "Accurate Buffer Overflow Detection via Abstract Payload Execution", In Proceedings of the 5th Symposium on Recent Advances in Intrusion Detection (RAID '02) Zurich, CH, Oct. 16-18, 2002, pp. 274-291.

Tzermias, Z., et al, "Combining Static and Dynamic Analysis for the Detection of Malicious Documents", In Proceedings of the Fourth European Workshop of System Security (EUROSEC '11) Salzburg, AT, Apr. 2011.

U.S. Appl. No. 13/301,741, filed Nov. 21, 2011.

U.S. Appl. No. 61/535,288, filed Sep. 15, 2011.

Vendicator "Stack Shield: A 'Stack Smashing' Technique Protection Tool for Linux", Jan. 7, 2000, available at http://angelfire.com/sk/stackshield.

Wang, X. et al., "SigFree, A Signature-free Buffer Overflow Attack Blocker" In Proceedings of the 15th USENIX Security Symposium, Vancouver, BC. CA, Jul. 31-Aug. 4, 2006, pp. 225-240.

Written Opinion in International Patent Application No. PCT/US2006/015080, filed Apr. 21, 2006, mailed Jul. 7, 2008.

Written Opinion in International Patent Application No. PCT/US2006/032470, filed Aug. 18, 2006, mailed May 14, 2008.

Written Opinion in International Patent Application No. PCT/US2006/041591, filed Oct. 25, 2006, mailed Jun. 25, 2008.

Written Opinion in International Patent Application No. PCT/US2012/055824, filed Sep. 17,2012, mailed Dec. 7, 2012.

Yuan, L. et al., "Security Breaches as PMU Deviation: Dectecting and Identifying Security Attacks Using Performance Counters", In Proceedings of the Second Asia-Pacific Workshop on Systems (APSys '11), Shanghai, CN, Jul. 11-12, 2011.

Zhang, Q., et al., "Analyzing Network Traffic to Detect Self-Decrypting Exploit Code", In Proceedings of the 2nd ACM Symposium on Information, Computer and Cummunications Security (ASIACCS '07), Singapore, Mar. 20-22, 2007, pp. 4-12.

Office Action dated Sep. 7, 2012 in U.S. Appl. No. 13/301,741.

* cited by examiner

SYSTEMS, METHODS, AND MEDIA PROTECTING A DIGITAL DATA PROCESSING DEVICE FROM ATTACK

CROSS-REFERENCE TO RELATED APPLICATION

This application is a U.S. National Phase Application under 37 CFR 371 of International Patent Application No. PCT/US2006/032470 filed Aug. 18, 2006, which claims the benefit of U.S. Provisional Patent Application No. 60/709,170 filed Aug. 18, 2005, each of which is hereby incorporated by reference herein in its entirety.

FIELD OF THE INVENTION

The disclosed subject matter relates to the field of computer security. More particularly, the disclosed subject matter relates to systems and methods for detecting and inhibiting attacks launched by electronic mail (e-mail).

BACKGROUND

E-mail based worms and viruses, sometimes referred to as malware, may infect large numbers of hosts rapidly. E-mail malware can propagate as executable attachments that users are tricked into opening, thus potentially causing the malignant code to run and propagate. One way the propagation can occur, for example, is by the attacking code sending copies of itself to entries in the users' e-mail address books. While e-mail attachments are not the only vector by which malware propagates, they pose a substantial threat that merits special treatment, especially since attachments can be caught before they hit a user's machine. There are various approaches to defending against malicious software, for example, employing virus scanners to detect viruses.

Virus scanners are largely signature-based and typically identify security threats by scanning files for certain byte sequences that match already-known patterns of malicious code. Therefore, the scanners require an up-to-date signature database to be maintained. Maintaining such a database can be a difficult and resource-intensive problem. This problem can be exacerbated by the lag in the cycle of detecting a new attack and the deployment of a corresponding signature, especially when humans are involved in the process. Further complicating the situation is that many e-mail born viruses do not rely on software bugs. Instead, they rely on humans to click on the attachments, thus activating them. Thus, the need for frequent updates and the inherent delay between the creation of malicious software, and the detection and deployment of signatures or patches relegate signature-based techniques to a secondary role in the active security of systems.

Another approach, the use of behavior-based mechanisms, characterizes software based on the perceived effects that the software has on an examined system instead of relying on distinct signatures of that software. A benefit of this approach is that it can detect previously unseen attacks, that is, attacks for which the system has no prior knowledge or signatures. These attacks can be detected as long as there is some differentiation between the behavior of the attacking software and that of normal software. Many of these behavior-based systems rely on anomaly detection algorithms for their classification, and thus detection, of malignant code.

Anomaly-detection algorithms work by constructing models of normal behavior and subsequently checking observed behavior against these models for statistically significant variations that may hint at malicious behavior. The success of an anomaly detection algorithm can depend on the choice of an accurate behavior model. Host-based intrusion detection systems typically employ anomaly detection algorithms that are based on network activity, system call, and file system monitoring.

One negative aspect of host-based intrusion detection systems (IDS) is that the computational overhead associated with extracting behavior models from irregular and high-volume events may tax the processing power of the host. For example, analyzing all system calls in a system may impose considerable overhead due to the volume of events. Correlating this with the generally irregular nature of system calls imposes a considerable computational overhead. False positive rates may pose a further disadvantage.

Accordingly, it is desirable to provide systems and methods that overcome these and other deficiencies of prior systems.

SUMMARY

In accordance with some embodiments of the disclosed subject matter, systems, methods, and media for protecting a digital data processing device from attack are provided.

For example, in some embodiments, a method for protecting a digital data processing device from attack is provided, that includes, within a virtual environment: receiving at least one attachment to an electronic mail; and executing the at least one attachment; and based on the execution of the at least one attachment, determining whether anomalous behavior occurs.

As another example, in some embodiments, a system for protecting a digital data processing device from attack is provided, that includes at least one processor that: provides a virtual environment that: receives at least one attachment to an electronic mail; and executes the at least one attachment; and based on the execution of the at least one attachment, determines whether anomalous behavior occurs.

In yet another example, in some embodiments, a computer-readable medium containing computer-executable instructions that, when executed by a computer, cause the computer to perform a method for protecting a digital data processing device from attack is provided, that includes within a virtual environment: receiving at least one attachment to an electronic mail; and executing the at least one attachment; and based on the execution of the at least one attachment, determining whether anomalous behavior occurs.

BRIEF DESCRIPTION OF THE DRAWINGS

The above and other advantages of the disclosed subject matter will be apparent upon consideration of the following detailed description, taken in conjunction with accompanying drawings, in which.

DETAILED DESCRIPTION

Systems, methods, and media for protecting a digital data processing device from attack are provided in some embodiments of the disclosed subject matter. The ability of a host-based IDS to detect previously unseen malware and the ability of a mail-server based filtering solution can also be provided in various embodiments. For example, as further described herein, in some of such embodiments, incoming e-mail messages can be scanned at a mail server for potentially dangerous attachments such as, for example, worms or viruses. Such attachments can be sent to one of a set of protected environments running various mail user agents (MUA) and a host-based IDS. A mail reader, which can be part of an MUA, can open and execute e-mail attachments and the IDS can observe the resulting behavior. If the IDS detects suspicious behavior, it can notify the mail server. The mail server can then decide to discard the corresponding e-mail message. The system can be run in a virtual environment, such as a virtual machine (VM), so that clean-up does not need to be performed. Instead, the virtual environment can be discarded and a new one spawned for each new check.

It should be noted that adding computer power (e.g., faster or more machines) to the checking components of some embodiments of the disclosed subject matter can allow customization of the resources needed for defense. Various environments running various MUAs can be set up and selected, for example, based on the local user population. Traditional techniques such as pattern-matching or signature-based techniques to catch known viruses can also be incorporated with various embodiments of the disclosed subject matter. It should also be noted that a large number of malware-checking VMs can be operated in parallel to cope with high loads.

Figure 1:
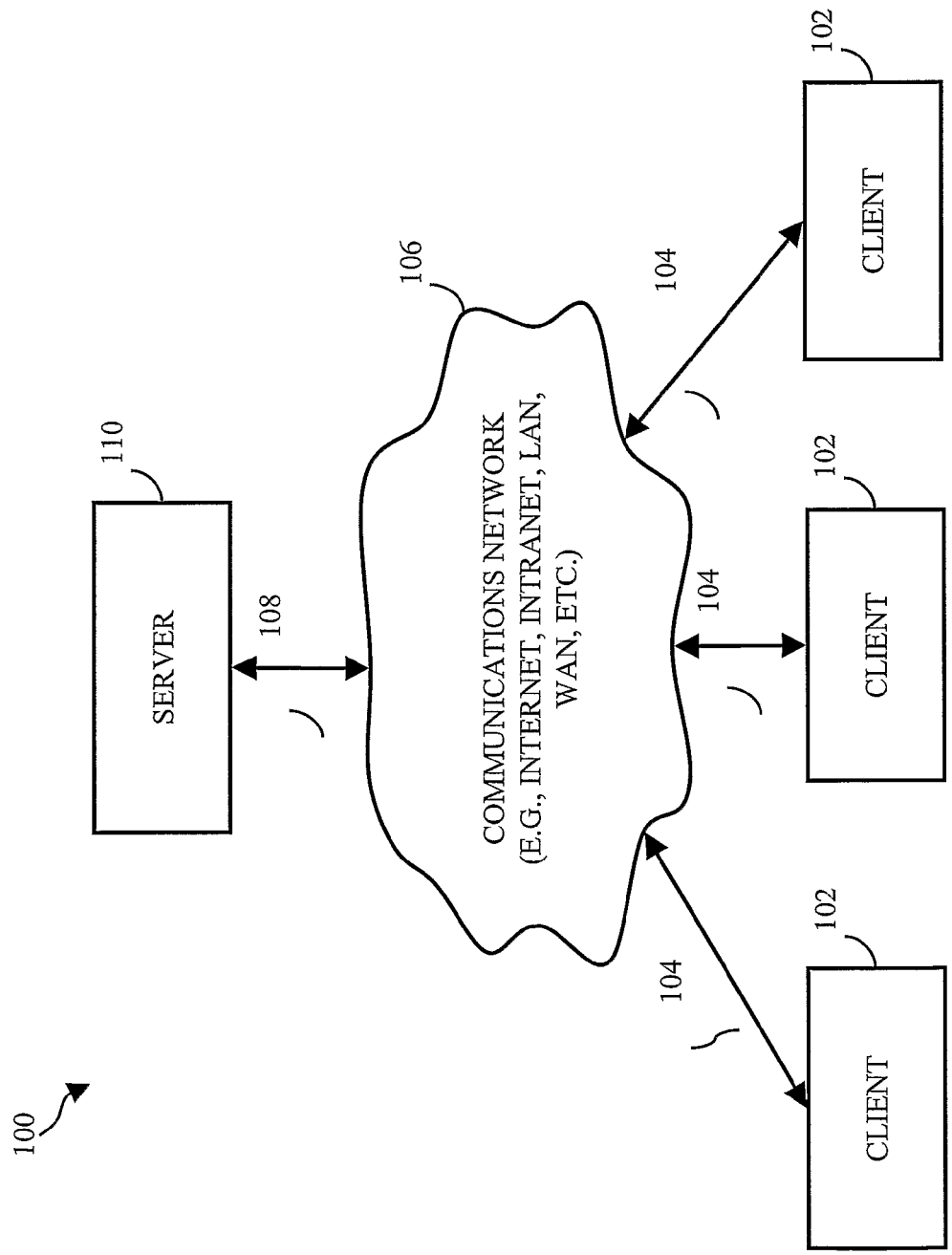
FIG. 1 is a schematic diagram of an illustrative system suitable for implementation of an application that monitors traffic and protects applications from attacks in accordance with some embodiments of the disclosed subject matter.

FIG. 1 is a schematic diagram of an illustrative system 100 for protecting an application from attack launched through e-mail in accordance with some embodiments of the disclosed subject matter. As illustrated, system 100 can include one or more clients 102. Clients 102 can be local to each other or remote from each other, and can be connected by one or more communications links 104 to a communications network 106. Communications network 106 can also be linked via a communications link 108 to a server 110. Various embodiments of the present application can be implemented on at least one of the server and the clients. It is also possible that a client and a server can be connected via communication links 108 or 104 directly and not through a communication network 106.

In system 100, server 110 can be any suitable digital processing device for executing an application, such as, for example, a server, a processor, a computer, a data processing device, or a combination of such devices. Communications network 106 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 can be any communications links suitable for communicating data between clients 102 and server 110, such as network links, dial-up links, wireless links, hard-wired links, etc. Clients 102 can be any suitable digital processing devices, such as, for example, personal computers, laptop computers, mainframe computers, dumb terminals, data displays, Internet browsers, personal digital assistants (PDAs), two-way pagers, wireless terminals, portable telephones, etc., or any combination of the same. Clients 102 and server 110 can be located at any suitable location. In one embodiment, clients 102 and server 110 can be located within an organization. Alternatively, clients 102 and server 110 can be distributed between multiple organizations.

Figure 2:
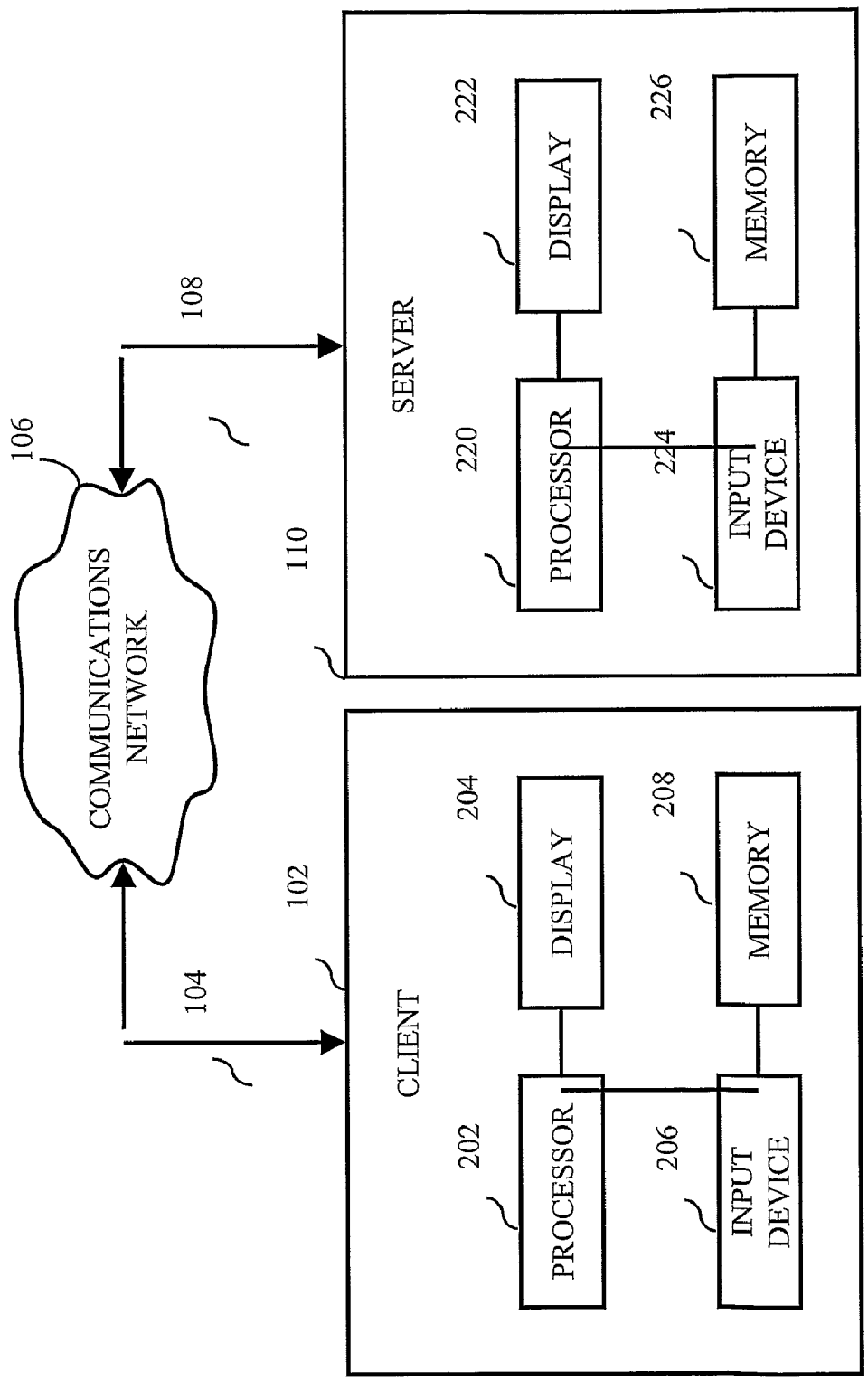
FIG. 2 is a detailed example of the server and one of the clients of FIG. 1 that can be used in accordance with some embodiments of the disclosed subject matter.

The server and one of the clients, which are depicted in FIG. 1, are illustrated in more detail in FIG. 2. Referring to FIG. 2, client 102 and server 100 can include respectively, for example, among other things, processors 202 and 220, displays 204 and 222, input devices 206 and 224, and memory 208 and 226, which can be interconnected. In some embodiments, memory 208 and 226 can contain a storage device for storing a program for controlling processors 202 and 220. Memory 208 and 226 can also contain applications for protecting at least one other application from attacks. In some embodiments, various applications can be resident in the memory of client 102 or server 110. It should be noted that variations and combinations of system 100 might be suitable for different embodiments of the disclosed subject matter.

Although the disclosed subject matter can be described as being implemented on a client and/or a server, this is only illustrative. Various components of embodiments of the disclosed subject matter can be implemented on any suitable platform (e.g., a personal computer (PC), a mainframe computer, a two-way pager, a wireless terminal, a portable telephone, a portable computer, a palmtop computer, a Handheld PC, an automobile PC, a laptop computer, a personal digital assistant (PDA), a combined cellular phone and PDA, etc.) to provide such features. Such platform can include, for example, among other things, a processor, a display, an input device, and memory as described above for the client and the server illustrated in FIG. 2.

Figure 3:
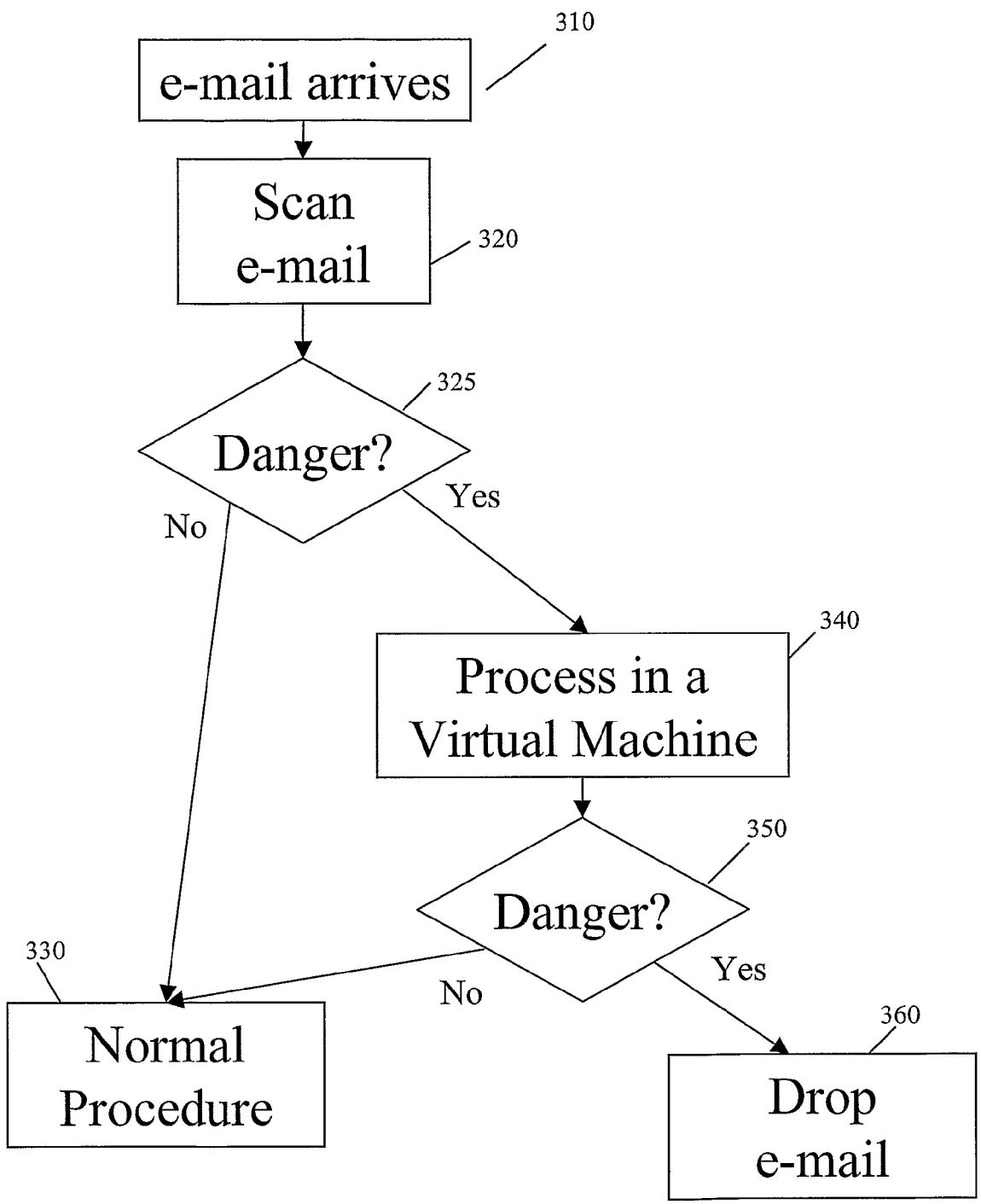
FIG. 3 is a simplified illustration of an embodiment of a method for protecting an application from attacks in accordance with the disclosed subject matter.

FIG. 3 illustrates an embodiment of a method for protecting a computer from attacks according to the disclosed subject matter. An e-mail is received, at 310, from a network, such as, for example, the Internet. The e-mail can be scanned, at 320, for potentially dangerous attachments such as, for example, worms, viruses, and/or Trojan Horses. If none are detected, at 325, the e-mail can proceed normally, at 330, by, for example, being sent on to its intended recipient. However, if a possibly dangerous attachment is detected, at 325, the attachment and/or the e-mail can be forwarded to a protected environment that can perform further analysis, at 340, to determine possible danger. This analysis, which is described in further detail below, can include, for example, opening each attachment, clicking on any hyperlinks, etc., and watching for suspicious behavior. It should be noted that the opening of the attachment can include executing the attachment and can include the use of software associated with the attachment, called by the attachment, or needed to open the attachment. If no danger is detected at 350, the e-mail can be handled normally, at 330, by, for example, being sent to its intended recipient. If danger is detected at 350, such as the detection of a virus, the e-mail can be treated specially, for example, it can be dropped or quarantined, at 360, and therefore not forwarded to its intended recipient. The use of additional methods, such as pattern-matching or signature based techniques can also be incorporated.

Figure 4:
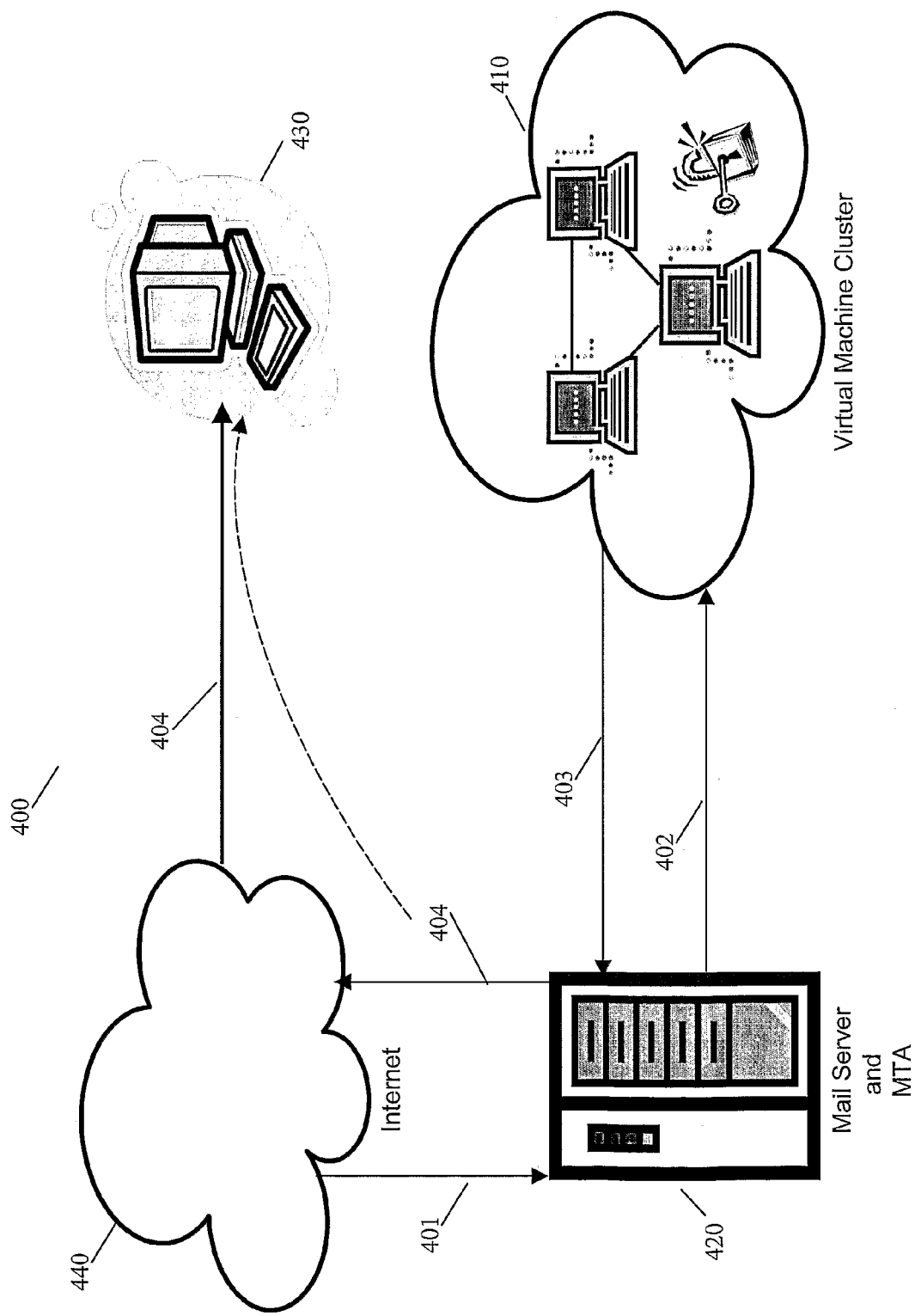
FIG. 4 is a simplified illustration of a system for monitoring electronic mail and protecting applications from attacks in accordance with some embodiments of the disclosed subject matter.

FIG. 4 illustrates a system 400 for implementing the disclosed subject matter. As shown, system 400 includes, among other things, a virtual machine cluster 410, a mail server 420, a user system 430, and the Internet 440. The virtual machine cluster 410 houses protected environments that can run instances of different MUAs and operating systems. A host-based IDS that detects anomalous behavior can also be located in the virtual machine cluster 410. However, the IDS can be run either inside a virtual environment on the cluster 410 or outside a virtual environment. A Mail Transport Agent (MTA) that classifies and manages potentially malicious e-mail messages can be run on Mail Server 420. System 400 can be implemented, for example, in system 100. A server 110 can be used as mail server 420. A client 102 can be used as a user system 430. Additional clients 102 can be used to embody virtual machine cluster 410. Of course, this is just one of various possible configurations for embodiments of the disclosed subject matter. For example, it is also possible that a number of servers 110 can be used to embody virtual machine cluster 410.

System 400 can be used to protect a computer from attack. For example, an e-mail can arrive, at 401, at server 420. The server can decide, based on, for example, if the e-mail contains any attachments, to transmit, at 402, the e-mail and any attachments to virtual machine cluster 410. The virtual machine cluster 410 can provide an indication, at 403, of whether an attack or malicious code is detected. The server 420 can decide, based in part on the indication 403, to transmit the message, at 404, to a client 430.

A host-based Intrusion Detection System (IDS) can run a potentially malicious application on a host machine. In order to be able to detect zero-day e-mail worms, a non signature-based approach can be used. For this purpose, a behavior-based mechanism, such as an IDS, can be used as the anomaly detection component of system 400.

Allowing an attack to run locally can render that particular machine useless for further use. For this reason, it is of benefit to test the potentially malicious software in an isolated and controlled environment that provides the required level of protection. A good candidate for this is a virtual machine environment that can be effectively flushed after each use without further impact to the underlying system. The virtual machine cluster 410 can be such an environment. As described above, virtual machine cluster 410 can house protected environments that run instances of different Mail User Agents (MUAs) and operating systems. Virtual machine images that contain a base system used across the virtual cluster can be used. These virtual machine images have the advantage of providing a test case that is identical (or similar) to the system of the intended recipient of the e-mail. An additional benefit of using a centralized virtual machine based architecture is that the need to deploy IDS and mail filtering software on large numbers of desktops can be avoided.

The Mail Transfer Agent (MTA), on server 420, in accordance with certain embodiments of the disclosed subject matter, can classify and filter potentially malicious e-mail, communicate with the host-based intrusion detection systems in virtual machine cluster 410, and maintain a queue of e-mails. The MTA 420 can act as a first line of defense and impose message classification and filtering. A learning component that can be included in system 400 and coupled to MTA 420 can facilitate the decision process by receiving feedback from the host-based IDS. The filtering component of the MTA can conceptually reside in front of the classification component. Filtering can be used, for example, to avoid denial-of-service attacks on the underlying system. In the case of a mass e-mail worm outbreak, for example, once the IDS determines that an e-mail contains a malicious payload and informs the MTA of this, subsequent e-mail containing identical payloads can be sent directly to the quarantine component, dropped, or otherwise prevented from reaching their target. This becomes more difficult to solve for polymorphic and metamorphic e-mail worms. In the presence of, for example, a high-volume polymorphic outbreak, some embodiments of the disclosed subject matter can alter all incoming e-mail that fits high-level characteristics, such as, for example, e-mail having an attachment or originating from a particular source. The e-mail can be pushed directly to a quarantine or replied to with a message, such as a "451 transient error, try again later" message.

Additionally, classification of messages can be performed on the basis of a set of heuristics such as the presence of attachments or embedded URLs. Once a message has been classified as suspicious, it can be sent to a host-based IDS in VM cluster 410. Messages arriving at a cluster 410 can be placed in temporary queues to wait for a decision from the IDS.

The mail user agents (MUA), located on virtual machine cluster 410, can retrieve and execute potentially malicious e-mail. An MUA can simulate the behavior of a naïve user by opening e-mail attachments and, for example, "clicking" on URLs. Using an MUA in this way, instead of simply downloading an e-mail or attachment directly, allows vulnerabilities to be exposed that are related to the use of that particular MUA.

Figure 5:
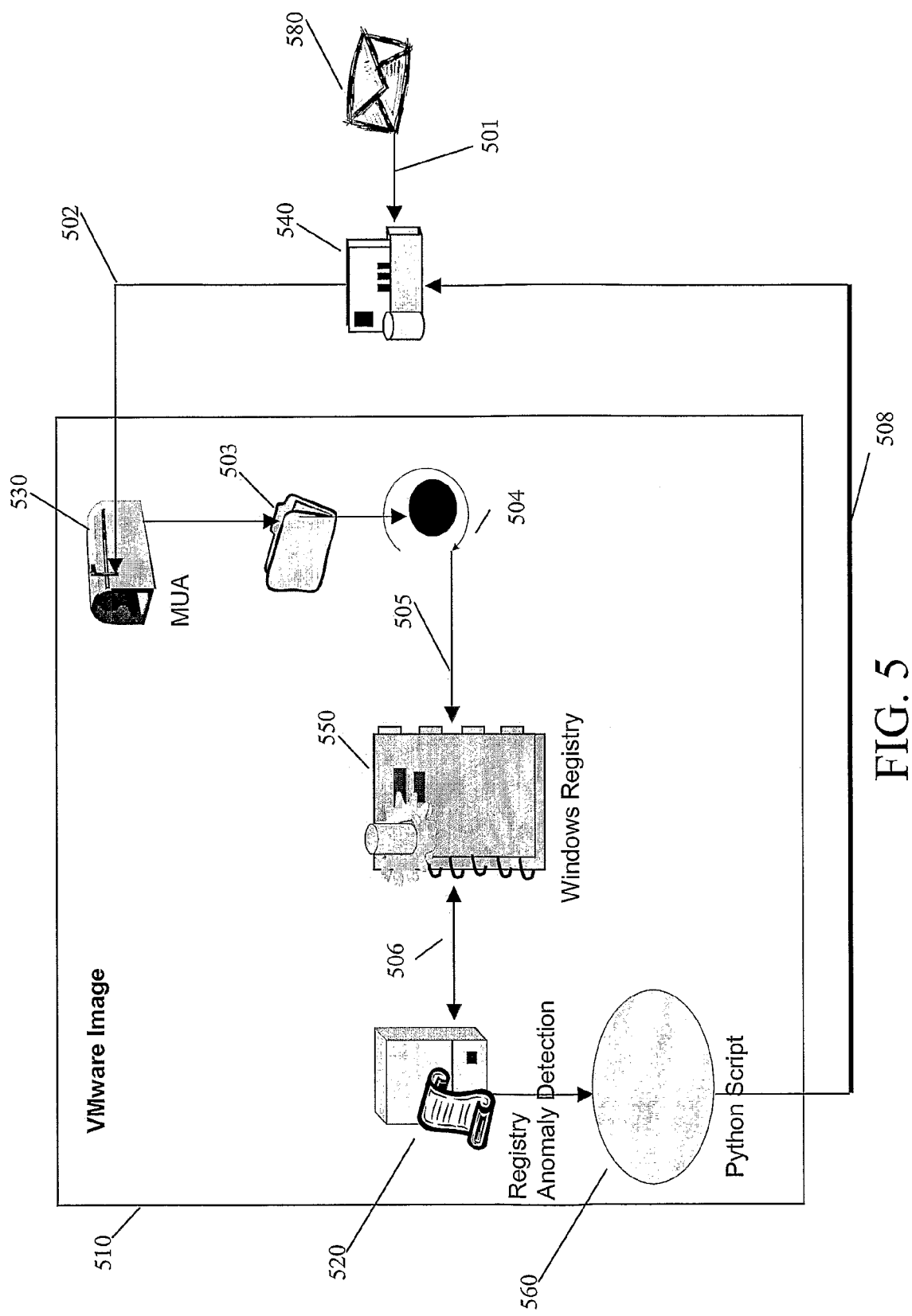
FIG. 5 is a simplified illustration of a process for monitoring electronic mail and protecting applications from attacks in accordance with some embodiments of the disclosed subject matter.

An illustrative embodiment of a virtual environment and an MTA is illustrated in FIG. 5. In this embodiment, virtual environment 510 is implemented using VMware, available from VMware, Inc. of Palo Alto Calif. Virtual environments 510 can be used to form a virtual machine cluster 410. Inside each virtual environment 510, an intrusion detection system and a mail user agent (MUA) 530 can be implemented. Registry Anomaly Detection (RAD) system 520 can be used as the intrusion detection system, and Microsoft Outlook 530, available from Microsoft Corporation of Redmond, Wash., can be used as the mail user agent (MUA) in certain embodiments. A mail transfer agent (MTA) 540 can be implemented using Postfix, available from postfix.org, and can be run, for example, on server 420 of FIG. 4. The MUA, as discussed above, is software that an e-mail user usually interacts with when dealing with e-mail. In the embodiment illustrated in FIG. 5, the MUA 530 is responsible for simulating the behavior of a naïve user by, for example, opening every attachment and "clicking" on every link. Any appropriate MUA can be used, such as, for example, Microsoft Outlook. The EZdetach plug-in, available from TechHit of San Francisco, Calif. can be used along with MUA 530. EZdetach can extract and save Outlook attachments from messages, as well as run custom scripts on these attachments. Script, 560, which, for example, can be implemented using the Python programming language, can wait for an indication from RAD 520 on whether an anomaly or possible attack was detected. Based on this indication, it can provide an indication to MTA 540 as to whether or not an e-mail should be allowed to reach a user.

This and similar configurations can be used to protect a computer from attack. For example, an e-mail 580 can arrive, at 501, at MTA 540. The MTA can transmit, at 502, the e-mail to MUA 530 inside VMWare Image 510. The MUA 530, can open 503 any attachments. As discussed, this opening can include executing, at 504, any attached or referenced software and "clicking" on any hyperlinks. Interactions, at 505, can take place with the Windows Registry 550. RAD 520 can monitor these interactions 505, at 506. An indication, at 508, of whether an attack or malicious code is detected can be provided to MTA 540.

As discussed above, an IDS can detect anomalous behavior, such the behavior of e-mail worms. In order to acquire the information needed to detect anomalous behavior, the embodiment illustrated in FIG. 5 can use RAD (Registry Anomaly Detection) 520, which monitors, in real-time, accesses to the Windows Registry 550 and detects malicious behavior. The Windows Registry is a database that stores settings and options and is an integral component of the Windows operating system. Furthermore, a majority of programs interact with Windows Registry frequently. These characteristics elevate the Windows Registry to strong candidate position as source of audit data. RAD 520 can attach a sensor to the registry and apply the acquired information to an anomaly detector that can correlate activity that corresponds to malicious software. An advantage of using RAD 520 is its ability to accurately detect anomalous behavior with a low computational overhead. The low overhead makes it a viable solution for real-time detection of malicious software. RAD 520 can construct a data model from features extracted directly from the registry sensor. These features include the name of the process accessing the registry, the type of query sent to the registry, the key that is being accessed, the response from the registry, and the value of the key that is being accessed. Using the features monitored from the registry accesses, RAD 520 can build a model from normal (non-attack) data. This model can be used to classify registry accesses as either normal or malicious.

Figure 6:
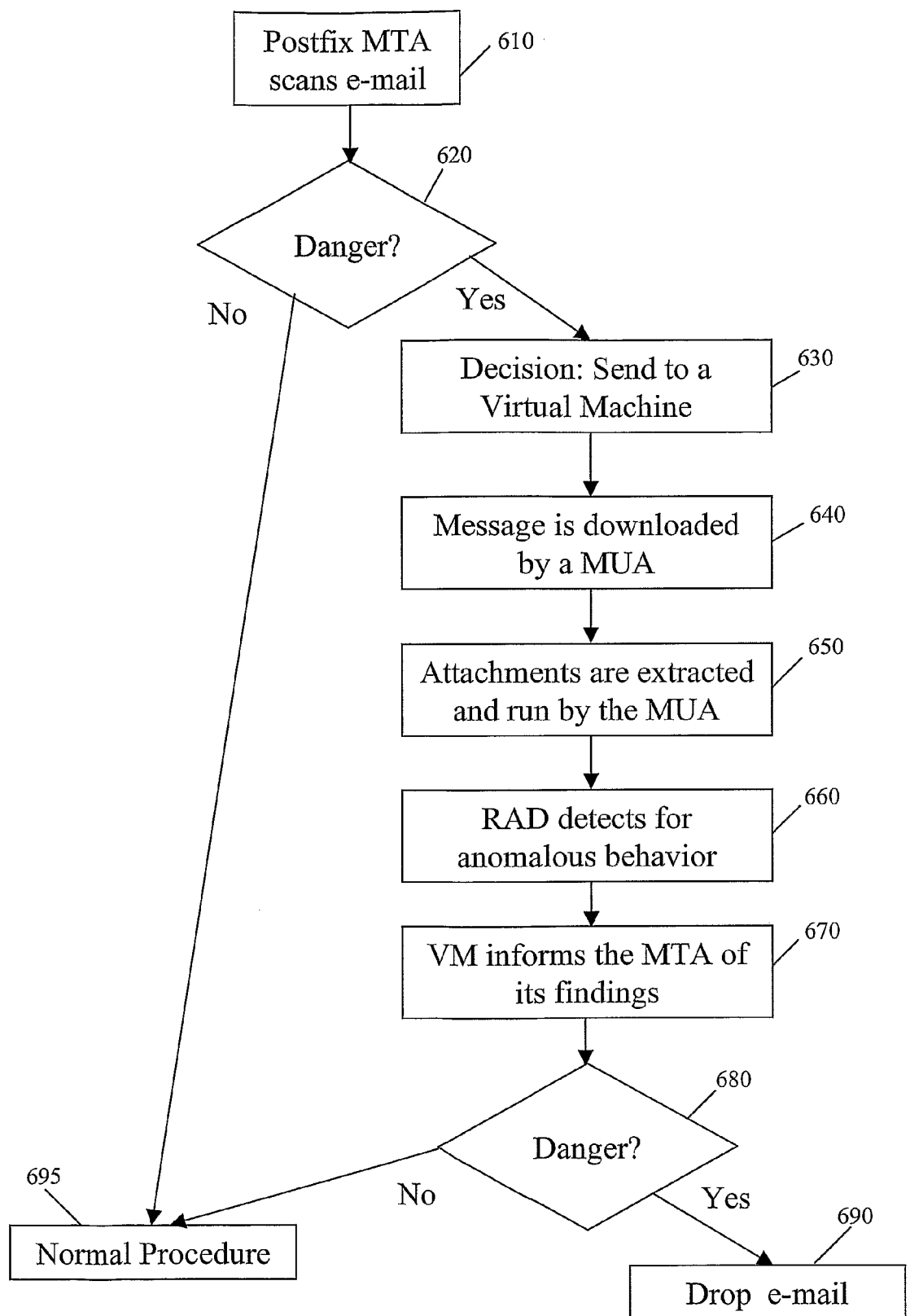
FIG. 6 is a simplified illustration of another embodiment of a method for protecting an application from attacks in accordance with the disclosed subject matter.

In conjunction with FIG. 5, FIG. 6 illustrates a process for protecting a computer from attack according to some embodiments of the disclosed subject matter. As shown, an e-mail is received from a network and scanned, at 610, by MTA 540. If the MTA 540 determines, at 620, that the e-mail is not a potential danger, it can handle the e-mail according to standard procedures 695. If the MTA 540 determines, at 620, that the e-mail is a potential danger, it can forward the e-mail, at 630, to a virtual machine 510. Upon receipt in the virtual machine 510, the e-mail can be downloaded, at 640, by MUA 530. Any attachments can be extracted and run by the MUA 530, at 650. This can result in interactions with the Windows Registry 550. Registry Anomaly Detection (RAD) 520 can observe this behavior and decide, at 660, if the behavior is outside of normal parameters. The virtual machine 510 or RAD 520 can inform the MTA 540, at 670, if it was decided that the e-mail contained dangerous attachments. Based at least in part on this information, MTA 540, can decide, at 680, to drop the e-mail, at 690, or follow normal procedures, at 695, by for example, delivering the e-mail.

Figure 7:
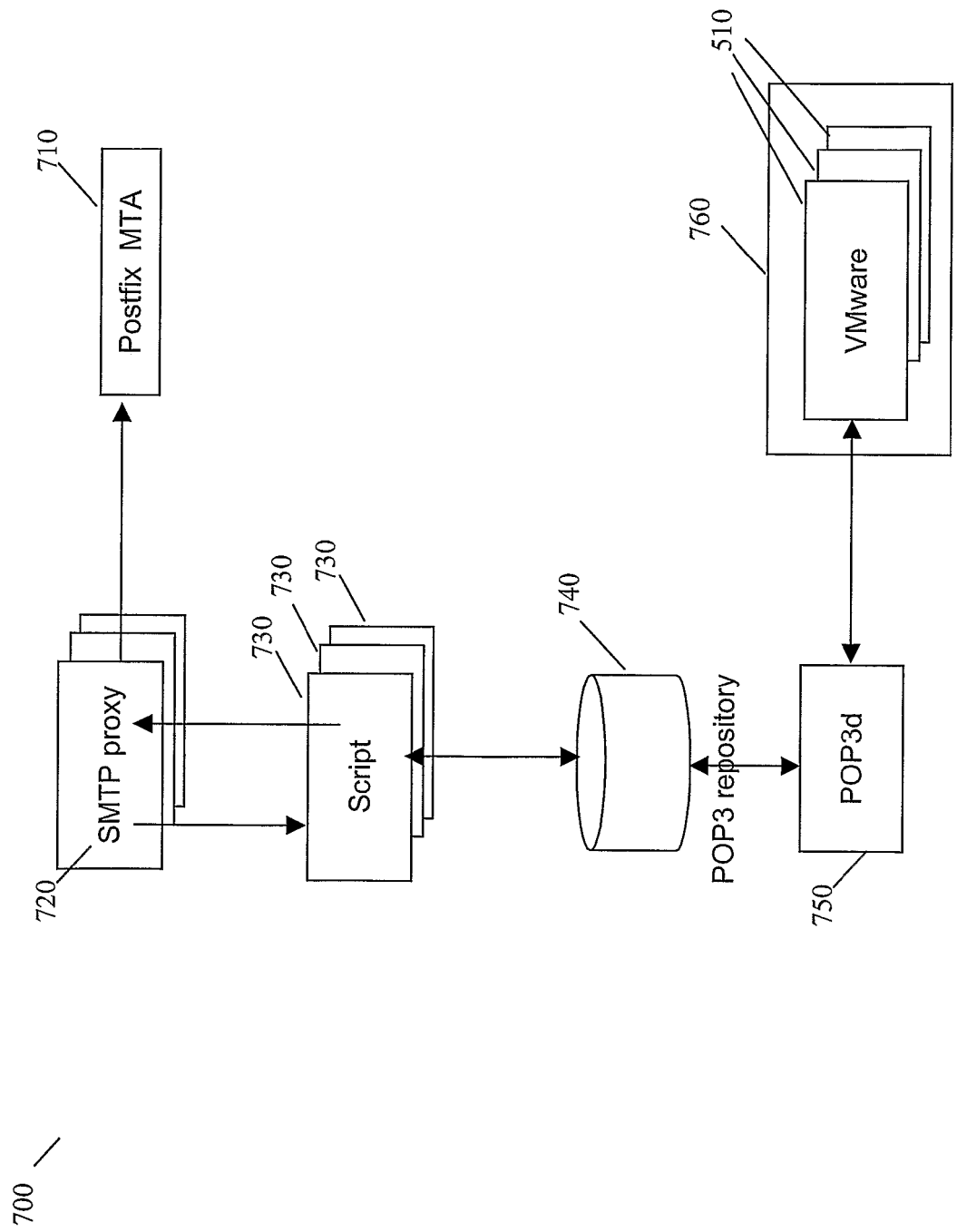
FIG. 7 is block diagram of a system for use in monitoring electronic messages and protecting applications from attacks in accordance with some embodiments of the disclosed subject matter.

MTA 540 can be implemented using any appropriate mailer, for example, Postfix. One illustrative embodiment of MTA 540 can have a front end that uses the smtp.proxy open-source package. FIG. 7 is a diagram illustrating an example front end for MTA 540 and components of MTA 540. In this diagram, Smtp.proxy 720, Post Office Protocol version 3 (POP3) repository 740, and Post Office Protocol version 3 daemon (POP3D) 750 represent this portion of MTA 540 of FIG. 5. Smtp.proxy 720 can be software that listens on the SMTP port (i.e., port 25) and waits for incoming SMPT connections. Upon arrival of an SMTP connection, the proxy 720 can contact the MTA 710 and go through the initial phase of HELO/MAIL/RCPT commands. A benefit of this embodiment is that the proxy does not need to know any special site-specific restrictions on, for example, acceptable domains or anti-spam measures, that can have been put in place by a Postfix administrator. When a remote MTA (for example, the MTA of a user who is sending an e-mail to a user on system 700) sends the DATA command, followed by the body of the e-mail message, the proxy 720 can save the DATA command in a uniquely named temporary file and invoke a script 730 after it has received the entire message, but before it responds to the DATA command of the remote MTA.

An instance of script 730 can be forked for every message received. It therefore can keep a tally of the number of scripts 730 that are currently running and waiting for a VM to become available. The script can also wait for an indication as to whether or not a possible attack has been detected. A limit of the number of instances can be chosen so that the queue of unprocessed messages does not grow steadily. If this limit is exceeded, a script 730 can cause an error condition, such as, returning a "451 transient error, try again later" message. Smtp.proxy can pass that message on to the remote MTA so that the mail message can be processed at a later time. The local copy of the message can then be removed. Script 730 can run the file with the contents of the e-mail message through a Multipurpose Internet Mail Extensions (MIME) normalizer. Script 730 can pass a copy of the message on to one of the virtual machines and wait for the VM to finish processing. The copy passed to the VM can include an extra header with the IP address and port to contact (e.g., 128.59.16.20:12588). The VM can respond with an indication as to whether the message is acceptable or not. If the message is deemed safe, script 730 can return with a "0" exit code, at which point smtp.proxy can pass the file on to the MTA 710 for eventual delivery. Otherwise, a "554 permanent error" response can be given to the proxy, which can pass it on to the remote MTA. The copy of the message can be discarded, a script 730 can exit, and another queued message can be processed.

Messages can be passed on to the VM cluster 760, from a script 730, using a pull model or a push model. Selecting the pull model, for example, can make the implementation easier. Using the pull model, script 730 can deposit every message in a POP3 repository 740, for example, using the Unix mail file format. As each VM becomes available, the topmost (oldest) message can be pulled from the POP3 server and processed, and then the VM can connect to the TCP port specified in the header. To ward against VM cluster failures or excessive load, each blocked script 730 process can time out after a given amount of time. This time can be permanent or user configurable. If this timeout occurs, the corresponding message can be removed from the POP3 server and a "451" error code can be sent to the remote MTA to indicate a transient error. In this case, the remote MTA can attempt to re-send the message at a later time. It should be noted that software, such as the POP3D 750, can be used for communications utilizing an internet protocol, such as POP3.

The systems illustrated in FIG. 5 and FIG. 7 can have multiple virtual machines making up a virtual machine cluster 410 or 760. Each virtual machine can run its own operating system and can co-exist on a single real machine, or alternately be spread among a plurality of real machines. Potentially dangerous applications can thus be isolated from each other by running them in separate virtual machines. A single VMware image 510 that contains an already-trained model for a host-based IDS, for example RAD 520, and the applications that are being tested, for example, standard Microsoft products (Office, Outlook, Outlook Express, Messenger, etc.) and various other popular applications. VMWare image 510 can have a settable disk mode that can control the external behavior of the VMWare image 510. The VMware image 510 can be used for a single detection session that tests a single e-mail attachment at a time. For this purpose, the VMware disk mode can be set to non-persistent, so that any changes made to disk are lost when the virtual machine is terminated. Having the disk in non-persistent mode can allow for the use of a repeatable-resume feature. Repeatable-resume features allows for a virtual machine to quickly start from a resumed state, thereby bypassing the need to reboot the operating system any time a new virtual machine environment is needed.

In some embodiments of the disclosed subject matter, scalability and reliability can be considered. Increasing scalability can increase the performance of an of e-mail worm detection architecture in a large-scale enterprise environment. Reduction of the rate of false positives can be achieved by combining the RAD 520 system with additional detectors, such as the Windows Event Log data. This combination can allow for the use of data correlation algorithms that can be used to improve behavior models. Reducing the time needed to detect malicious activity can be achieved by retrofitting MUAs to reduce the delay of checking and downloading messages. Reliability can help in dealing with complex issues such as targeted attacks against the system and encrypted e-mail.

One of the assumptions that can be made in various embodiments of the disclosed subject matter is that the virtual machine can mimic the behavior of an operating system. If a worm can detect the presence of a virtual machine, it could potentially vary its behavior avoiding detection. Therefore, in some embodiments, a virtual machine that can conceal its presence to the guest operating system is selected. In the absence of obvious clues from the VM, there are techniques that an attacker can use to detect the presence of a virtual machine such as, for example, timing attacks. Logic can be inserted into system 400 that identifies such techniques and inhibits the attackers from success.

Although the present invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow.

What is claimed is:

1. A method for protecting a digital data processing device from attack, the method comprising:
within a virtual environment in at least one hardware processor:
receiving at least one attachment to a first electronic mail;
executing the at least one attachment;
determining whether anomalous behavior occurs; and
generating feedback when anomalous behavior is determined to have occurred;
receiving, using at least one hardware processor, at least one attachment to a second electronic mail;
receiving, using at least one hardware processor, the feedback; and
based on the feedback, performing, using at least one hardware processor, filtering on the second electronic mail.

2. The method of claim 1, further comprising:
executing at least one hyperlink to the first electronic mail; and
based on the execution of the at least one hyperlink, determining whether anomalous behavior occurs.

3. The method of claim 1, further comprising dropping the first electronic mail upon determining that anomalous behavior has occurred.

4. The method of claim 1, wherein the executing of the at least one attachment to the first electronic mail is performed using a mail user agent.

5. The method of claim 4, further comprising selecting the mail user agent from a plurality of mail user agents.

6. The method of claim 1, wherein determining whether anomalous behavior occurs comprises detecting anomalous behavior with a registry.

7. The method of claim 6, further comprising observing information associated with interactions with the registry when anomalous behavior is detected, wherein the information is at least one of the name of a process, a query, a key, and a response.

8. The method of claim 1, further comprising restarting the virtual environment at least in part in response to detecting anomalous behavior.

9. The method of claim 1, further comprising creating signatures at least in part in response to detecting anomalous behavior.

10. A system for protecting a digital data processing device from attack, the system comprising:
at least one hardware processor that:
provides a virtual environment that:
receives at least one attachment to a first electronic mail;
executes the at least one attachment;
determines whether anomalous behavior occurs; and
generates feedback when anomalous behavior is determined to have occurred;
receives at least one attachment to a second electronic mail;
receives the feedback; and
based on the feedback, performs filtering on the second electronic mail.

11. The system of claim 10, wherein the at least one processor also:
executes at least one hyperlink to the first electronic mail; and
based on the execution of the at least one hyperlink, determines whether anomalous behavior occurs.

12. The system of claim 10, wherein the at least one processor drops the first electronic mail upon determining that anomalous behavior has occurred.

13. The system of claim 12, wherein the at least one processor executes the at least one attachment to the first electronic mail using a mail user agent.

14. The system of claim 10, wherein the at least one processor selects the mail user agent from a plurality of mail user agents.

15. The system of claim 10, wherein the at least one processor determines whether anomalous behavior occurs by detecting anomalous behavior with a registry.

16. The system of claim 15, wherein the at least one processor observes information associated with interactions with the registry when anomalous behavior is detected, wherein the information is at least one of a name of a process, a query, a key, and a response.

17. The system of claim 10, wherein the at least one processor restarts the virtual environment at least in part in response to detecting anomalous behavior.

18. The system of claim 10, wherein the at least one processor creates signatures at least in part in response to detecting anomalous behavior.

19. A non-transitory computer-readable medium containing computer-executable instructions that, when executed by a computer, cause the computer to perform a method for protecting a digital data processing device from attack, the method comprising:

within a virtual environment:

receiving at least one attachment to a first electronic mail;

executing the at least one attachment;

determining whether anomalous behavior occurs; and generating feedback when anomalous behavior is determined to have occurred;

receiving at least one attachment to a second electronic mail;

receiving the feedback; and based on the feedback, performing filtering on the second electronic mail.

20. The non-transitory computer-readable medium of claim 19, wherein the method further comprises:

executing at least one hyperlink to the first electronic mail; and based on the execution of the at least one attachment, determining whether anomalous behavior occurs.

21. The non-transitory computer-readable medium of claim 19, wherein the method further comprises dropping the first electronic mail upon determining that anomalous behavior has occurred.

22. The non-transitory computer-readable medium of claim 19, wherein the executing of the at least one attachment to the first electronic mail is performed using a mail user agent.

23. The non-transitory computer-readable medium of claim 22, wherein the method further comprises selecting the mail user agent from a plurality of mail user agents.

24. The non-transitory computer-readable medium of claim 19, wherein determining whether anomalous behavior occurs comprises detecting anomalous behavior with a registry.

25. The non-transitory computer-readable medium of claim 24, wherein the method further comprises observing information associated with interactions with the registry when anomalous behavior is detected, wherein the information is at least one of the name of a process, a query, a key, and a response.

26. The non-transitory computer-readable medium of claim 19, wherein the method further comprises restarting the virtual environment at least in part in response to detecting anomalous behavior.

27. The non-transitory computer-readable medium of claim 19, wherein the method further comprises creating signatures at least in part in response to detecting anomalous behavior.

\* \* \* \* \*